Patented May 16, 1939

2,158,358

UNITED STATES PATENT OFFICE 2,158,358

SEPARATION OF WAX FROM OIL

Louis P. Evans, Beacon, N. Y., assignor to The Texas Company, New York, N. Y., a corporation of Delaware No Drawing. Application February 24, 1937, Serial No. 127,403

7 Claims. (Cl. 196—18)

This invention relates to the separation of wax from wax-bearing oil.

It contemplates dewaxing wax-bearing oil with the aid of a wax crystal modifying substance. More particularly, the invention concerns solvent dewaxing in the presence of a small amount of a wax crystal modifying substance, such as crude montan wax, metal soaps of the higher fatty acids, such as aluminum stearate, or mixtures of such soap with crude montain wax. Suitable metal soaps may include lead stearate, magnesium stearate, magnesium palmitate, or mixtures thereof. It is also contemplated employing metal soaps of naphthenic acids, such as aluminum and lead naphthenate.

The method of my invention involves completely dissolving the wax crystal modifying substance in a comparatively small amount of a suitable solvent to form a concentrated solution of such character that when it is mixed in small proportion with a mixture of wax-bearing oil and dewaxing solvent, full benefit of the modifying action of the modifier upon the crystal structure of the wax will be realized.

Wax crystal modifying substances, such as those mentioned above, possess the ability to impart a beneficial action upon the structure of the wax crystals formed during chilling of the wax-bearing solution in which the modifying substance is present in comparatively small amount. The modifying action is such that the wax is precipitated in a form or condition which is conducive to rapid filtration of the precipitated wax from the cold wax-bearing mixture. Realization of this effect, however, is dependent in a large measure upon the conditions under which the substance is incorporated in the wax-bearing oil, or solution of wax-bearing oil and solvent prior to chilling.

It is thought that the beneficial modifying action is realized by having the modifier completely, or substantially completely, dissolved in the wax-bearing oil solution at the outset, and in a condition such that upon chilling of the wax-bearing solution, the modifier precipitates substantially co-extensively with the wax. Where both high and low melting point wax constituents are present in substantial amount in the oil undergoing dewaxing, there will be substantial precipitation of wax over the entire chilling range. It is desirable, therefore, when dewaxing such oil to obtain the effect of the modifying action over the entire chilling range. Consequently, it is desirable to have the wax crystal modifying substance precipitate from the solution concomitant with both high and low melting point wax constituents.

As a means of realizing this effect, it is, in some instances, advantageous to employ as the modifying substance a mixture of crude montan wax and a metal soap such as aluminum stearate. Crude montan wax imparts modifying action upon those constituents of the wax which are precipitated in the upper chilling range, or in the initial stages of chilling. On the other hand, aluminum stearate imparts substantial modifying action upon those wax constituents precipitated in the lower chilling ranges; that is, at temperatures in the neighborhood of 0° F. and below.

It has been found that the addition of the straight modifying substance to a solution of wax-bearing oil in the dewaxing solvent at temperatures around those at which the wax and oil appear to be just completely dissolved in the solvent, namely, around 90° to 125° F., does not necessarily result in any particular improvement in character of the wax crystals precipitated from the standpoint of adaptability to removal by filtration. It is thought that this may be due to the modifying substance not having been completely dissolved in the wax-bearing solution, and therefore not uniformly distributed throughout the solution.

One method of effecting complete and true solution of the modifying substance in the wax-bearing solution has been to heat the mixture of wax-bearing oil, solvent, and modifying substance to a temperature of around 15° to 50° F. above the temperature at which the wax and oil appear to be just completely dissolved in the solvent. Thereafter, the hot mixture is chilled to precipitate the wax, and the wax constituents so precipitated removed by filtration.

The present invention involves a departure from the foregoing procedure since it comprises dissolving the main body of wax-bearing oil to be dewaxed in a selective dewaxing solvent, such as a mixture of acetone and benzol or methyl ethyl ketone and benzol, and then forming a separate concentrated solution of the modifying substance in a suitable solvent medium. This concentrated solution is then incorporated in the wax-bearing solution, and the entire mixture, without further heating, chilled to the dewaxing temperature in order to precipitate the wax constituents, in a form conducive to their removal by rapid filtration.

In this way, the main body of wax-bearing oil and dewaxing solvent need only be heated to a temperature of around 110° to 120° F. prior to chilling. Following this procedure, I am able to realize results similar to those obtained when heating the entire mixture of wax-bearing oil, solvent, and modifying substance to a temperature in the range 140° to 170° F.

The concentrated solution of crude montan wax is prepared by mixing about 25% by weight of crude montan wax and 75% by weight of lubricating oil to a temperature of around 190° to 200° F. At such temperature, the montan wax is rapidly and completely dissolved in the oil, which is to be contrasted with the low degree of miscibility existing between montan wax and straight mineral lubricating oil at temperatures below 190° F.

It is also to be contrasted with the relatively low solubility of crude montan wax in a selective dewaxing solvent, such as mixtures of acetone and benzol, or methyl ethyl ketone and benzol, unless large volumes of solvent are used and heated to high temperatures.

At temperatures above 190° F., montan wax is instantly miscible in substantially all proportions with mineral lubricating oil.

On the other hand, when preparing a suitable concentrated solution containing aluminum stearate, this is accomplished by mixing about 8% by weight of aluminum stearate with 92% of a solution consisting of equal parts of mineral lubricating oil and a selective solvent mixture, preferably a portion of the dewaxing solvent mixture. This mixture is heated with agitation to a temperature of 140° F. until complete solution occurs. A clear solution is thus obtained, and there is no sign of precipitation from this solution until it is cooled to temperatures around 125° F. The lubricating oil component of the concentrated solution advantageously comprises a small proportion of the wax-bearing oil undergoing dewaxing although lubricating oil from other sources may be employed.

I employ lubricating oil as a constituent of the concentrated solution since aluminum stearate is not readily soluble in a mixture of aliphatic ketone and benzol, due, apparently, to the antisolvent action of the ketone upon the stearate. It is also undesirable, from a practical standpoint, to employ individual organic solvents such as benzol in the preparation of the concentrate, since the solvent subsequently accumulates in the main body of dewaxing solvent, thereby altering its composition and causing it to lose its selective action as between wax and oil at the dewaxing temperatures.

In employing the method of my invention for dewaxing a solvent-refined wax-bearing lubricating oil distillate derived from Mid-Continent crude, and having a Saybolt Universal viscosity of around 60 seconds at 210° F. I proceed as follows:

The main body of wax distillate is mixed with a solvent mixture comprising 40% by volume of methyl ethyl ketone and 60% of commercial 90% benzol. The oil is mixed with the solvent in the proportion of one volume of oil to three and one-half volumes of selective solvent mixture. This mixture is then heated to a temperature of not over 120° F., and which corresponds to about the minimum temperature of apparent complete solution of wax and oil in the solvent mixture.

A small quantity of each of the foregoing concentrates is then added to the warm solution, that is, a concentrated solution of montan wax, at a temperature of 190° F. or above, is added to the solution in an amount such that the crude montan wax will be present to the extent of about 0.05% by weight of the wax-bearing oil being dewaxed.

The aluminum stearate concentrate, at a temperature of around 140° F., is likewise incorporated in the wax-bearing solution with agitation, and in an amount such that the aluminum stearate is present in the solution to the extent of 0.25% by weight of the wax-bearing oil undergoing solution. The entire mixture is then chilled at a uniform rate of around 1½° F. per minute, from a solution temperature of 120° F. down to —15° F., or whatever temperature is necessary in order to precipitate the desired amount of wax and produce an oil having the desired low pour test.

This cold mixture is then filtered to produce an oil which, after removal of the solvent, will have a pour test, for example, around —10° or —15° F. The precipitated wax is removed in the form of a filter cake which may be washed with fresh solvent to remove adhering oil.

The total yield of wax-bearing oil will be around 81% by volume of the charge.

The resulting filter cake will be comparatively thin, about two-thirds or less of the volume of wax filter cake obtained where the wax crystal modifying substance is not properly incorporated in the wax-bearing solution, as above described.

In addition, the wax cake will contain substantially less retained oil.

While the above example has been described in connection with the use of a mixture of methyl ethyl ketone and benzol, it is contemplated that other selective solvent mixtures, composed of mixtures of a good oil solvent and a wax anti-solvent may be employed. For example, mixtures of acetone or methyl ethyl ketone and an aromatic hydrocarbon of the type such as benzol, toluol, etc. Other wax anti-solvent liquids than the low-boiling aliphatic ketones may be used. Also, other good oil solvents besides benzol and toluol may be used as, for example, the low-boiling aliphatic ethers such as ethyl ether and isopropyl ether.

Also, while reference has been made to crude montan wax, it is intended to include either the crude montan wax or its active constituents or ingredients which possess the desired modifying action upon the structure of paraffin wax.

Obviously, many modifications and variations of the invention, as hereinbefore set forth, may be made without departing from the spirit and scope thereof, and therefore only such limitations should be imposed as are indicated in the appended claims.

I claim:

1. The method of dewaxing a wax-bearing oil which comprises mixing the oil to be dewaxed with a dewaxing solvent maintaining the mixture at a temperature of around 100 to 120° F., forming a concentrated solution of crude montan wax in mineral lubricating oil at a temperature of around 190° F. and above such that when incorporated in the wax-bearing solution and chilling the wax-bearing solution, the montan wax precipitates substantially coextensively with the high melting point wax constituents of the oil which are precipitated above 0° F., adding said concentrated solution in small proportion to the mixture of wax-bearing oil and dewaxing solvent, chilling the mixture to 0° F. and below to precipitate wax constituents, and removing the wax constituents so precipitated.

2. The method of dewaxing wax-bearing mineral oil which comprises mixing the oil with a selective solvent comprising a mixture of a good oil solvent and a wax anti-solvent, heating the mixture to a temperature of around 100° to 120° F., forming a concentrated solution of crude montan wax in lubricating oil at a temperature of 190° F. and above, adding said concentrated solution in small proportion to the mixture of wax-bearing oil and dewaxing solvent such that when incorporated in the wax-bearing solution and chilling the wax-bearing solution, the montan wax precipitates substantially coextensively with the high melting point wax constituents of the oil which are precipitated above 0° F., chilling the mixture to 0° F. and below to precipitate wax constituents, and removing the wax constituents so precipitated.

3. The method according to claim 2 in which the selective solvent comprises a mixture of an aliphatic ketone and benzol.

4. The method of dewaxing wax-bearing oil which comprises mixing the oil with a dewaxing solvent liquid, forming a concentrated solution of crude montan wax in oil at a temperature of around 190° F., forming a separate concentrated solution of a metal soap of the higher fatty acids and having wax crystal modifying properties in a mixture of oil and solvent liquid at a temperature of around 140° F., adding both said concentrated solutions in small proportion to the mixture of wax-bearing oil and dewaxing solvent at a temperature of around 100 to 120° F., chilling the mixture to precipitate wax constituents, and removing the wax constituents so precipitated.

5. The method of dewaxing wax-bearing oil which comprises mixing the oil with a dewaxing solvent liquid, forming a concentrated solution of crude montan wax in oil at a temperature of around 190° F., forming a separate concentrated solution of aluminum stearate in a mixture of oil and solvent liquid at a temperature of around 140° F., adding both said concentrated solutions in small proportion to the mixture of wax-bearing oil and dewaxing solvent at a temperature of around 100 to 120° F., chilling the mixture to precipitate wax constituents, and removing the wax constituents so precipitated.

6. The method of dewaxing wax-bearing mineral lubricating oil which comprises dissolving the oil in a selective solvent comprising a mixture of an oil solvent liquid and a wax anti-solvent liquid at a temperature of around 100° to 120° F., forming a concentrated solution of crude montan wax in lubricating oil at a temperature of around 190° F., forming a separate concentrated solution of aluminum stearate in a mixture of lubricating oil and selective solvent liquid at a temperature of around 140° F., adding both of said concentrated solutions in small proportion to the solution of wax-bearing mineral oil and solvent, chilling the mixture to precipitate the wax constituents, and removing the wax constituents so precipitated.

7. The method according to claim 6 in which the selective dewaxing solvent comprises a mixture of an aliphatic ketone and benzol.

LOUIS P. EVANS.